Jan. 31, 1939.　　　　P. ARRIGHI　　　　2,145,230
THERMOSTATIC AIR VALVE FOR COMBUSTION ENGINES
Filed Sept. 22, 1936
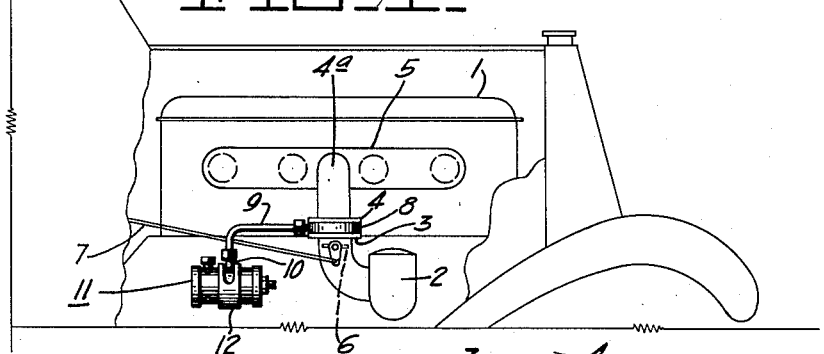
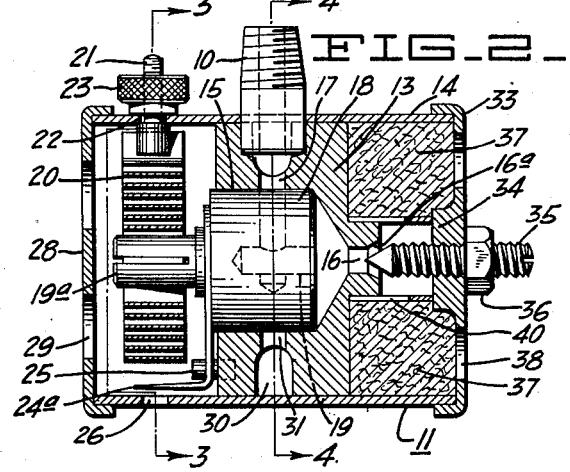
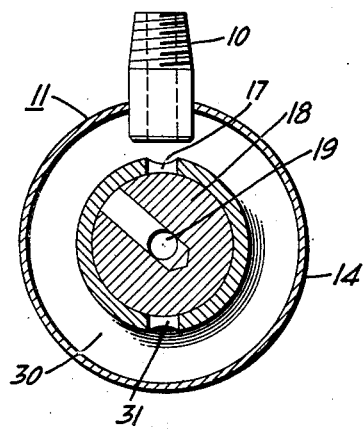
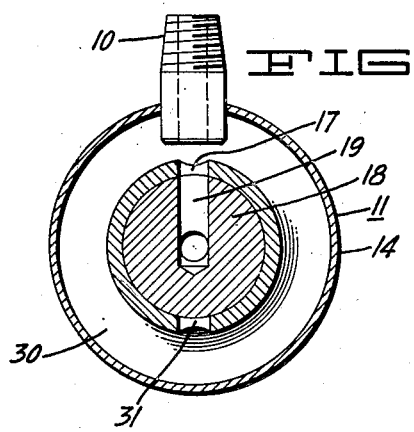
INVENTOR Patented Jan. 31, 1939

2,145,230

UNITED STATES PATENT OFFICE 2,145,230

THERMOSTATIC AIR VALVE FOR COMBUSTION ENGINES

Pietro Arrighi, Oakland, Calif.

Application September 22, 1936, Serial No. 101,968

8 Claims. (Cl. 137—139)

The present invention relates to air valves for supplying air to an internal combustion engine and more particularly to air valves controlled by a thermostatic coil which are responsive to the thermal condition of the engine.

It has always been a problem in the construction and design of internal combustion motors to provide a fuel supply system which will permit the proper mixture of fuel to enter the motor combustion chambers during the variable conditions that an engine is called upon to operate under.

Most of the fuel supply systems employ the use of a carburetor which depends for its operation upon the suction created by the intake stroke of the various cylinders of an engine. This suction is transmitted to the carburetor through an intake manifold, and it is through such an intake manifold that the fuel mixture supplied by the carburetor is sucked up to the combustion chambers.

While the amount of fuel as it enters into the intake manifold is generally controlled by a manually operable butterfly valve which is arranged at the outlet of the carburetor and where it is connected to the intake manifold, the quality of the fuel mixture entering into the intake manifold from the carburetor is predetermined by an adjustment thereon.

In most cases this adjustment is made so as to supply too rich a mixture to the motor, resulting in improper combustion, racing of the engine and most of all, waste of fuel.

It is an object of the present invention to overcome this disadvantageous condition by permitting an extra supply of air to enter the intake manifold and mix with the fuel as soon as the engine is warm and does not require such a rich mixture.

A further object of the present invention is to provide a properly constructed valve which will supply this extra supply of air to the engine and which is entirely automatic in its function.

Another object of the invention is to control this air supply valve by means of a thermostatic coil which is highly responsive to the thermal condition of an internal combustion engine, so that it may open said valve and permit the correct amount of extra air to enter the intake manifold only when said engine is operating at its proper temperature and at its highest efficiency, thus resulting in a considerable saving of actual fuel consumed.

Another object of the present invention is to provide a thermostatically controlled air valve which is provided with an adjustment whereby the action of the thermostat upon said valve is hastened or delayed in order to compensate for the seasonal temperature changes of the year and the general climatic condition of the section of the country it is used in.

A further object of the present invention is to provide a thermostatic air valve which when properly connected to an internal combustion engine will supply the same with a filtered stream of air to mix with and augment the fuel supply from the carburetor whenever said engine is operating at its greatest efficiency and when a fair amount of suction is maintained.

Another object of the present invention is to provide a thermostatic air valve for supplying air to an internal combustion engine which valve is entirely automatic in its operation once properly adjusted, and which comprises a minimum number of parts operating cooperatively and resulting in the proper mixture of fuel to enter the engine once the latter has reached its thermal efficiency.

Other objects and features of advantage will appear hereinafter, and while only the preferred form of construction is shown and described, it is to be understood that the invention is not limited to such preferred form but that various changes and adaptations may be made therein without departing from the spirit of the invention as hereinafter claimed.

Referring to the drawing which accompanies the specification and forms a part thereof:

Figure 1 is a side elevation of a typical combustion engine as used in motor vehicles, showing a carburetor and an intake manifold with the present invention applied thereto.

Figure 2 is a longitudinal section taken through the thermostatically controlled air valve disclosing the various mechanical features thereof.

Figure 3 is a transverse section taken through the device along the line 3—3 of Figure 1.

Figure 4 is a similar section taken on line 4—4 of Figure 1, illustrating the valve stem in wide open position, wherein the valve intake port is connected with the valve outlet port.

Figure 5 is similar to Figure 4 except that the valve stem is in closed position, wherein the valve intake port and the valve outlet port are not in registry with each other.

In viewing Figure 1 of the drawing, it will be seen that the combustion engine 1 is equipped with the usual type of carburetor 2 which is attached with its flanged end 3 to a complementary flanged end 4 on the intake manifold 5. A butterfly valve 6 is arranged slightly below flange 3, and a suitable linkage connection 7 leading therefrom to a conventional throttle in the driver's compartment of the vehicle affords pedal adjustment of butterfly valve 6, so as to permit the suction of the engine to draw fuel thereinto according to the position of the butterfly valve 6. A spacer 8, interposed between the flanges 3 and 4 and having a central aperture identical in size to the passage leading from the carburetor 2 to the intake manifold 5, is provided at its leftward side with a nipple, to which is attached the one end of a tube 9, the other end of which is attached to a similar nipple 10 projecting upwardly from the thermostatic valve 11, thus forming an unobstructed passage therefrom to the intake manifold 5.

The thermostatic valve 11 which is the object of the present application, may be attached to any place on the engine 1, but it is advisable to secure it alongside the exhaust manifold in order to render the thermostat within said valve more responsive to the heat radiated thereby. A circular band or strap 12 is provided as a simple and inexpensive means for fastening valve 11 to any convenient cap screw on the motor 1, thus making the installation of said valve an easy and inexpensive matter requiring no special equipment or tools.

In Figure 2 of the drawing may be seen the simplicity of design of air valve 11. Here, it will be noted that the air valve 11 includes a center portion 13 which is closely press-fitted into a tubular section 14. The latter is cut to size as far as length is concerned, and forms a housing around the other parts comprising the entire valve structure 11. A central bore 15 is provided in the center portion 13 and this bore runs in alignment with the longitudinal axis of valve 11. Bore 15 is in communication with an air inlet port 16 and an outlet or suction port 17 (Figures 2, 3, 4, and 5). Seated within said bore 15, and rotatable therein, is a valve stem 18 having a right angular passage 19, one end of which is always held in registry with inlet port 16, while the other end is normally held out of registry with an outlet port 17, thereby preventing any air from passing from the inlet port 16 to the outlet port 17, as will be more fully described hereinafter.

Valve stem 18 has a reduced and slotted portion 19a which is adapted to receive the inner end of a thermostatic coil 20, the outer end of which is firmly held in the slotted head of a screw 21. This screw extends through a circumferential slot 22 and is held in place by a knurled nut 23, enabling manual adjustment of said screw 21 within circumferential slot 22 for the purpose of controlling the rotational movement of valve stem 18 from a closed position, as shown in Figure 5, to a wide open position, as shown in Figures 2 and 4, wherein valve passage 19 is aligned with outlet port 17 and air may freely pass through from the inlet port 16 upon application of suction by the motor.

Rigidly secured to valve stem 18 is an arm 24 which rotates in unison with valve stem 18. A pin 25 serves as a stop to prevent movement of valve stem 18 past a fully open position. A leftward extending end on arm 24 terminates in an indicator hand 24a which is disposed diametrically opposite the adjustable screw 21. This indicator may be seen at all times from the outside of the valve through another circumferential slot 26 thus giving the operator of the vehicle a visible indication of the adjustment of said valve stem 18, with respect to the distance it will have to travel from its initial or closed position to wide open stop position. A cover plate 28 tightly fitted over the left end of tubular casing 14 and having suitable perforations 29 protects the assembly of operating parts 18 and 20 from excessive dust and grit, but will permit hot air to enter the enclosure to result in a more responsive coil 20.

In order to assure absolutely free rotational movement of valve stem 18 upon expansion and contraction of thermostatic coil 20 when the vacuum of engine 1 is applied to said valve stem through the outlet or suction port 17, an annular groove 30 has been provided on center portion 13 having a transverse bore 31 which is exactly positioned diametrically opposite to outlet port 17. It is therefore apparent that when suction is applied from the engine 1, such suction will be applied to said valve stem simultaneously from two sides thereby offsetting any tendency on the part of valve stem 18 to be drawn and sucked against the section of the wall in central bore 15 surrounding the port 17.

Means are also provided for manual regulation of the volume of air entering into inlet port 16 according to the type of engine and the mechanical condition thereof.

The right side cover plate 33 is therefore equipped with an inwardly projecting boss 34 having a threaded hole which is adapted to receive a set screw 35. This set screw has a tapered end which is complementary to the angular counterbore 16a of inlet port 16 and by adjusting screw 35 inwardly or outwardly, it is thus possible to control the stream of air entering inlet port 16. After the proper adjustment is made lock nut 36 is screwed tight against cover plate 33.

Inasmuch as the air which is allowed to enter the intake manifold 4a through air valve 11 must mix with the fuel sucked in from the carburetor, it is essential that this extra air supply be free from particles of dirt. To this end a filtering material 37 such as mineral wool, is provided in the air valve structure 11 and all air coming in through the perforations 38 in cover plate 33 must first pass through filtration material 37 before it can pass through the intake port 16. In order that none of this fibrous filtering material will be sucked into the valve chamber along with the incoming air, a slotted sleeve 40 is fitted with one end over the reduced portion of member 13 which surrounds the inlet port 16, while the other end abuts the boss 34 of cover plate 33, thus forming a small chamber entirely free of any filtering material just ahead of said inlet port 16.

It will presently be described how the new device functions during operation of an internal combustion engine to which it is applied and such as is illustrated in Figure 1 of the accompanying drawing.

As already mentioned hereinbefore, the present invention depends for its operation upon the extent of suction created by the motor to which it is attached and primarily the extent of suction present in the intake manifold 4a which is controlled by the position of butterfly valve 6. Whenever the operator of the vehicle opens the butterfly valve for quick acceleration of said engine, the suction present in the intake manifold is reduced and a lesser amount of air from auxiliary air valve 11 is permitted to enter said intake manifold as the engine needs a rich mixture of fuel so it may turn at a greatly increased speed. Conversely, if the operator of the vehicle wishes the motor to operate at cruising speed, butterfly valve 6 will be only slightly opened, resulting in a greater amount of suction in intake manifold 4a and hence greater suction therein to draw air from said auxiliary air valve 11. In such an event, the suction in said intake manifold 4a will cause air to be sucked through perforations 38 in cover plate 33 and through filtration material 37, where the air is purified, and through slotted sleeve 40 into the air inlet port 16. From there the air will pass through angular passage 19 in valve stem 18 and through outlet port 17 and passage 9 into intake manifold 4a where it will mix with the fuel. This procedure, of course, depends entirely upon whether or not coil 20 is fully expanded with arm 24 against stop pin 25 and the transverse portion of passage 19 in valve stem aligned with outlet or suction port 17, as clearly shown in Figures 2 and 3. If on the other hand this is not the case, as when the engine is not warmed up sufficiently to cause expansion of thermostat 20, then valve stem 18 is held in its initial location such as shown in Figure 5, and then passage 19 is not in registry with outlet port 17 thereby preventing any additional air to enter said intake manifold until the engine has warmed up sufficiently to cause expansion of coil 20 and consequent rotation of valve stem 18 where air is allowed to pass through to the intake manifold continuously as long as the engine 1 is warm.

It is thus apparent that upon installation of the present invention and once the manual adjustment of air inlet port 16 and of the climatic compensating arrangement on coil 20 have been set, air valve 11 will function entirely automatically without any further attention by the operator of the vehicle to supply the additional amount of air to the motor in direct proportion to the suction in the intake manifold 4a.

I claim:

1. An air valve for supplying air to an internal combustion engine comprising a valve body having an inlet and outlet port, said ports being separated by a rotatable valve stem, said valve stem having a central bore held in registry with said air inlet port and a connecting bore at right angle thereto being normally held out of registry with said outlet port; a thermostatic control secured with one end to said valve body and with the other end to said valve stem, whereby expansion of said thermostatic control will cause rotation of said valve stem resulting in a continuous passage of air from said inlet port to said outlet port upon suction of said engine.

2. An air valve for supplying air to an internal combustion engine comprising a valve body having a central bore in line with its longitudinal axis, an inlet port and an outlet port communicating with said central bore, a valve stem rotatably seated within said central bore having an air passage held in registry with said inlet port and a second air passage at right angle to said first passage and connected therewith, said second passage being normally held out of registry with said outlet port, a thermostatic coil fastened with its outer end to said valve body and with its inner end to said valve stem, and means for limiting the rotational movement of said valve stem upon expansion of said thermostatic coil to a position where said second air passage is held in full registry with said outlet port to permit air to enter said engine upon suction thereof.

3. An air valve for supplying air to an internal combustion engine comprising a valve body having a central bore in line with its longitudinal axis, an inlet port and an outlet port communicating with said central bore, a valve stem rotatably seated within said central bore having an air passage in line with said inlet port and in registry therewith, and having a second air passage at right angle to said first passage and connected therewith, and held normally out of registry with said outlet port, a thermostatic coil arranged within said valve body and attached with its outer end thereto; the inner end of said coil being fastened to said valve stem, means for varying the amount of rotational movement necessary for said valve stem to move from a closed position to a fully open position upon expansion of said thermostatic control, and means for limiting the rotational movement of said valve stem upon reaching open position, wherein said second air passage is held in full registry with said outlet port, so as to permit a continuous flow of air to said engine upon suction thereof.

4. An air valve for supplying air to an internal combustion engine comprising a valve body having a central bore in line with its longitudinal axis, an inlet port and an outlet port communicating with said central bore, a valve stem rotatably seated within said central bore having an air passage in line with said inlet port and in registry therewith, and having a second air passage at right angle to said first passage and connected therewith and held normally out of registry with said outlet port, a thermostatic coil arranged within said valve body and attached with its outer end thereto; the inner end of said coil spring being fastened to said valve stem, means for varying the amount of rotational movement necessary for said valve stem to move from a closed position to a fully open position upon expansion of said thermostatic control, and means for limiting the rotational movement of said valve stem upon reaching open position, wherein said second air passage is held in full registry with said outlet port, so as to permit a continuous flow of air to said engine upon suction thereof, and means contained within said valve body for filtering the air before entering said valve inlet port.

5. An air valve for supplying air to an internal combustion engine comprising a valve body having a central bore in line with its longitudinal axis, an inlet port and an outlet port communicating with said central bore, said inlet port being manually adjustable as to size, a valve stem rotatably seated within said central bore having an air passage in line with said inlet port and in registry therewith, and having a second air passage at right angle to said first passage and connected therewith and held normally out of registry with said outlet port, a thermostatic coil arranged within said valve body and attached with its outer end thereto; the inner end of said coil being fastened to said valve stem, manual and visible adjusting means for varying the amount of rotational movement necessary for said valve stem to move from a closed position to a fully open position upon expansion of said thermostatic control, and means for limiting the rotational movement of said valve stem upon reaching open position, wherein said second air passage is held in full registry with said outlet port, so as to permit a continuous flow of air to said engine upon suction thereof, and means contained within said valve body for filtering the air before entering said valve inlet port.

6. An air valve for supplying air to an internal combustion engine comprising a valve body having a central bore in line with its longitudinal axis, an inlet port and an outlet port communicating with said central bore, said inlet port being manually adjustable as to size, a valve stem rotatably seated within said central bore having an air passage in line with said inlet port and in registry therewith; said valve stem having a second air passage at right angle to said first passage and connected therewith, and being held normally out of registry with said outlet port, a thermostatic coil arranged within said valve body and attached with its outer end thereto; the inner end of said coil spring being fastened to said valve stem, atmospheric compensating means manually adjusable according to the atmospheric condition of the air whereby the amount of rotational movement necessary for said valve stem to move from a closed position to a fully open position upon expansion of said thermostatic coil may be varied in order to render said air valve more sensitive to the thermal condition of said engine, and means on said valve stem for indicating the adjustment of said atmospheric compensating means through an external opening in said valve body, means for limiting the rotational movement of said valve stem upon reaching open position wherein said second passage is held in full registry with said outlet port so as to permit a continuous flow of air to said engine upon suction thereof and in proportion thereto, and means contained within said valve body for filtering the air before entering said valve inlet port.

7. An air valve comprising a valve body having a central bore, an inlet and an outlet port communicating with said central bore, a valve stem rotatably seated within said central bore having an internal passage normally held out of registry with said inlet and outlet ports; a thermostatic coil surrounding the free end of said valve stem, the latter being slotted to receive the inside end of said thermostatic coil, the outside end thereof being secured to a fixed portion on said valve body, whereby upon expansion of said thermostatic coil circular motion is imparted to said valve stem causing the internal passage thereof to be brought into registry with said inlet and outlet ports; an external cylindrical housing surrounding said air valve having perforations to permit free access of air to said inlet port and to said thermostitic coil.

8. An air valve comprising a valve body having a central bore, an inlet and an outlet port communicating with said central bore, a valve stem rotatably seated within said central bore, said valve stem having a conduit normally held out of registry with said inlet and outlet ports; an auxiliary port terminating within said central bore and being disposed diametrically opposite to said outlet port and being connected therewith by means of an annular passage; a thermostatic coil secured with one end to said valve body and with the other end to said valve stem, whereby expansion of said thermostatic coil will cause said valve stem to be rotated into connecting position relative to said inlet and outlet ports.

PIETRO ARRIGHI.